United States Patent

McFarland

(10) Patent No.: US 7,382,271 B2
(45) Date of Patent: *Jun. 3, 2008

(54) AUTOMATED POSITION DETECTION FOR WIRELESS BUILDING AUTOMATION DEVICES

(75) Inventor: Norman R. McFarland, Palatine, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 265 days.

This patent is subject to a terminal disclaimer.

(21) Appl. No.: 10/953,171

(22) Filed: Sep. 29, 2004

(65) Prior Publication Data

US 2006/0074494 A1   Apr. 6, 2006

(51) Int. Cl.
*G08B 21/00* (2006.01)

(52) U.S. Cl. ............... 340/686.6; 340/825.49; 340/539.2

(58) Field of Classification Search ............. 340/686.6, 340/825.36, 825.49, 539.1, 540, 541, 539.13, 340/539.14, 539.2, 525, 3.1, 3.5
See application file for complete search history.

(56) References Cited

U.S. PATENT DOCUMENTS

| | | | |
|---|---|---|---|
| 4,751,689 A | 6/1988 | Kobayashi | |
| 4,894,810 A | 1/1990 | Jukkala | |
| 5,266,944 A * | 11/1993 | Carroll et al. | 340/825.36 |
| 5,300,875 A | 4/1994 | Tuttle | |
| 5,491,670 A | 2/1996 | Weber | |
| 5,638,046 A | 6/1997 | Malinowski | |
| 5,953,368 A | 9/1999 | Sanderford et al. | |
| 5,987,058 A | 11/1999 | Sanderford et al. | |
| 6,078,269 A | 6/2000 | Markwell et al. | |
| 6,369,710 B1 * | 4/2002 | Poticny et al. | 340/572.1 |
| 6,560,462 B1 | 5/2003 | Ravi et al. | |
| 6,700,533 B1 | 3/2004 | Werb et al. | |
| 6,735,630 B1 | 5/2004 | Gelvin et al. | |
| 6,745,038 B2 * | 6/2004 | Callaway et al. | 455/456.1 |
| 6,774,797 B2 * | 8/2004 | Freathy et al. | 340/573.1 |
| 6,856,236 B2 * | 2/2005 | Christensen et al. | 340/3.5 |
| 6,990,335 B1 | 1/2006 | Shamoon et al. | |
| 7,002,470 B1 | 2/2006 | Miao | |
| 7,035,650 B1 | 4/2006 | Moskowitz et al. | |
| 7,064,660 B2 * | 6/2006 | Perkins et al. | 340/539.13 |
| 7,076,211 B2 | 7/2006 | Donner et al. | |
| 7,081,693 B2 | 7/2006 | Hamel et al. | |
| 7,142,107 B2 | 11/2006 | Kates | |
| 7,148,803 B2 | 12/2006 | Bandy et al. | |
| 2002/0006788 A1 | 1/2002 | Knutsson et al. | |
| 2002/0042274 A1 | 4/2002 | Ades | |
| 2002/0143935 A1 | 10/2002 | Schenkel et al. | |
| 2003/0007473 A1 | 1/2003 | Strong et al. | |

(Continued)

*Primary Examiner*—George A Bugg
*Assistant Examiner*—Travis R Hunnings

(57) ABSTRACT

In a building environment, a coordinate location or local position of various automation devices is determined. The location or position may be determined using a wireless distance measurement. Applications, associations, and utilizations for wireless building automation devices are developed according to location and/or positions of the devices. The position may be determined based on techniques for determining a relative distance of device from other devices and/or a reference point. The position may be mapped to the coordinate location within the building. Devices may be grouped, a commissioning table of binding associations between devices may be created, and addresses assigned to the building automation devices according to the location, the position and/or distances between the devices. Associations between devices may be established and updated based on proximity of the devices. Device communication also may be controlled according to position and distance information.

48 Claims, 4 Drawing Sheets

U.S. PATENT DOCUMENTS

| | | |
|---|---|---|
| 2003/0012168 A1 | 1/2003 | Elson et al. |
| 2003/0020595 A1 | 1/2003 | Wacyk |
| 2003/0035342 A1 | 2/2003 | Harrington et al. |
| 2003/0051032 A1 | 3/2003 | Schenkel et al. |
| 2003/0122577 A1 | 7/2003 | Kail, IV |
| 2003/0137968 A1 | 7/2003 | Lareau et al. |
| 2003/0142587 A1 | 7/2003 | Zeitzew |
| 2003/0206115 A1 | 11/2003 | Krumm et al. |
| 2004/0100394 A1 | 5/2004 | Hitt |
| 2004/0104841 A1 | 6/2004 | Syrjarinne |
| 2004/0144849 A1 | 7/2004 | Ahmed |
| 2004/0212500 A1 | 10/2004 | Stilp |
| 2005/0040943 A1 | 2/2005 | Winick |
| 2005/0135292 A1 | 6/2005 | Graumann |
| 2006/0044152 A1 | 3/2006 | Wang |
| 2006/0046664 A1 | 3/2006 | Paradiso et al. |
| 2006/0071780 A1* | 4/2006 | McFarland ............... 340/539.2 |
| 2006/0071782 A1* | 4/2006 | Ahmed et al. ......... 340/539.13 |

* cited by examiner

AUTOMATED POSITION DETECTION FOR WIRELESS BUILDING AUTOMATION DEVICES

BACKGROUND

The present invention relates to wireless building automation. In particular, wireless building automation devices may be assigned applications, associations and utilization based on a detected position.

Building control devices are positioned throughout a building. Security, fire, heating, ventilation, air conditioning (HVAC) or other networks of devices automate building control. For example, a temperature sensor or thermostat is mounted to a wall in a room to provide for control to a corresponding actuator located above a ceiling in the room for controlling airflow, heating or cooling in the room. As another example, a motion sensor is positioned on a ceiling for actuating a light controlled by a ballast above the ceiling.

The relative position of devices with respect to each other and/or location of a device with respect to building structure may be used for building automation. The desired locations for devices are plotted on a chart or a blueprint, or printed as a listing for desired locations for the automation system. From the blueprint of listing, the devices are located manually within the building structure at or near corresponding structures.

Manually locating devices for replacement may be time consuming and costly. The chart or blueprint may not accurately or precisely reflect the device locations. Locating a faulty or malfunctioning device is difficult due to inaccuracies in the chart or blueprint, particularly where the device is located out of site above a ceiling or in a wall. Adding visual indications identifying a location of an otherwise out of site device is unaesthetic.

BRIEF SUMMARY

By way of introduction, the embodiments described below include methods, processes, apparatuses, and systems for applying building automation to wireless building automation devices based on relative positions of the devices. In a building automation, various features alone or in combination assist in determining distances. A position for a building automation device may be determined based on a distance determination to a reference point such as an origin of a coordinate system. The position for a building automation device also may be determined based on a distance determination between devices. The distance determination may be based on wireless communications, acoustic signals, radio frequency information, manual distance measurement or any other distance measurement techniques. Communication between devices allows coordination for the determination of distances associated with different devices within a network. From the distance determination, a relative position of a device may be determined and one or more applications, associations, and utilizations for a wireless device may be developed.

In a first aspect, a method is provided for locating building automation devices. Locations of devices are determined for a plurality of building automation devices using wireless communication of distance information between the building automation devices. The devices are mapped with respect to a building structure according to the determined locations. Proximate building automation devices may be identified based on the determined locations of the building automation devices. A binding association between a building automation device and one or more proximate building automation devices may be assigned, and wireless communication between the devices controlled according to the distance determination.

In a second aspect, a method is provided for controlling building automation. A local position for at least one building automation device is determined with respect to a reference point using wireless communication with the building automation device. An application process is assigned to the at least one building automation device according to the local position for the at least one building automation device. An address for the device may be assigned based on the mapped local position of the device. Communication with the device may be controlled based on the mapped local position for the device.

In a third aspect, a building automation system is provided. The system includes at least one building automation device and a processor. The processor determines a local position for at least one building automation device using wireless communication with the building automation device. The processor also assigns an application process to the building automation device according to the local position for the building automation device. The system maps the local position for the building automation device to a system plan for the building and assigns application processes according to the local positions for the devices.

In a fourth aspect, a building automation system is provided. At least one wireless building sensor is configured to communicate over a wireless network using a wireless network communication protocol. A building actuator communicates with the wireless building sensor over the wireless network based on a wireless communication distance determination.

In a fifth aspect, a building control network is provided including building automation devices. The building automation devices are located spaced apart with respect to a building. A controller wirelessly communicates with the building automation devices. The controller also determines a coordinate location for a building automation device, maps the coordinate location to a system plan for the building, and assigns an address to at least one of the building automation devices.

The present invention is defined by the following claims. Nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

In a wireless building architecture system, the coordinate location or local position of various automation devices is determined using a distance measurement. By providing a plurality of different distance measurements from one or more predetermined or known reference points, the coordinate location or local position for devices may be identified through triangulation or other techniques. As a location of each device within a network of devices is identified, further locations of other devices relative to the now known location of a device may be determined. The distance determination may be used to identify the position or location in a two- or three-dimensional space. The local position also may be used to control communication among devices, such as controlling communication signal strength. The coordinate positions may be used to create a commissioning table of binding associations between components. Associations between devices may be created and updated based on proximity and/or location of other components. Components may be assigned addresses and grouped according to known distances between components in the group. A map of the building automation devices with respect to building structure may be created or populated.

Distances between devices and reference points may be determined using one-way or two communication. Time-of-flight information of a wireless signal is used to identify a distance. Radio frequency, acoustic, combinations thereof or other types of signals also may be used.

Figure 1:
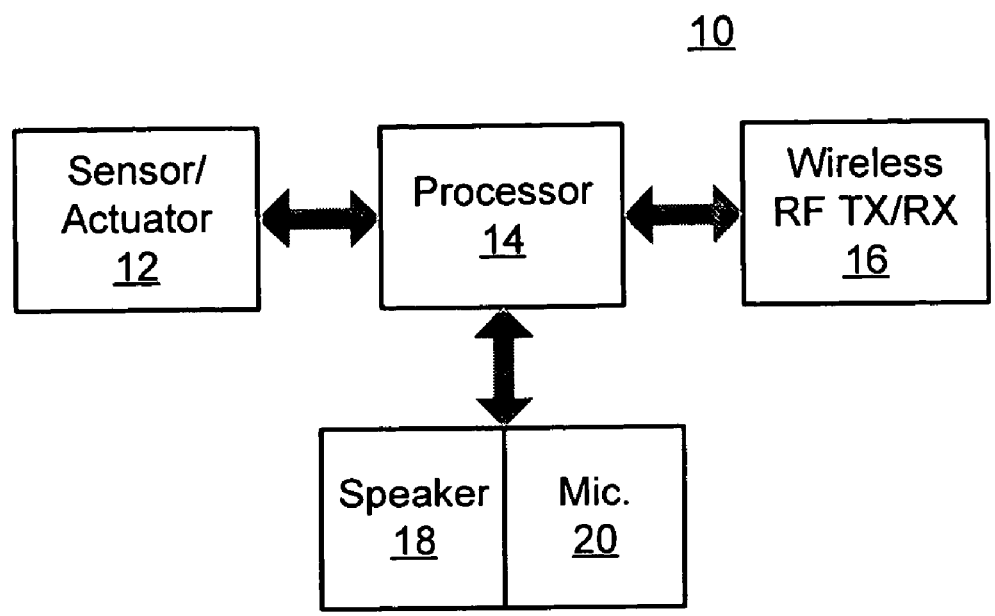
FIG. 1 is a block diagram of one embodiment of a building automation device.
Figure 2:
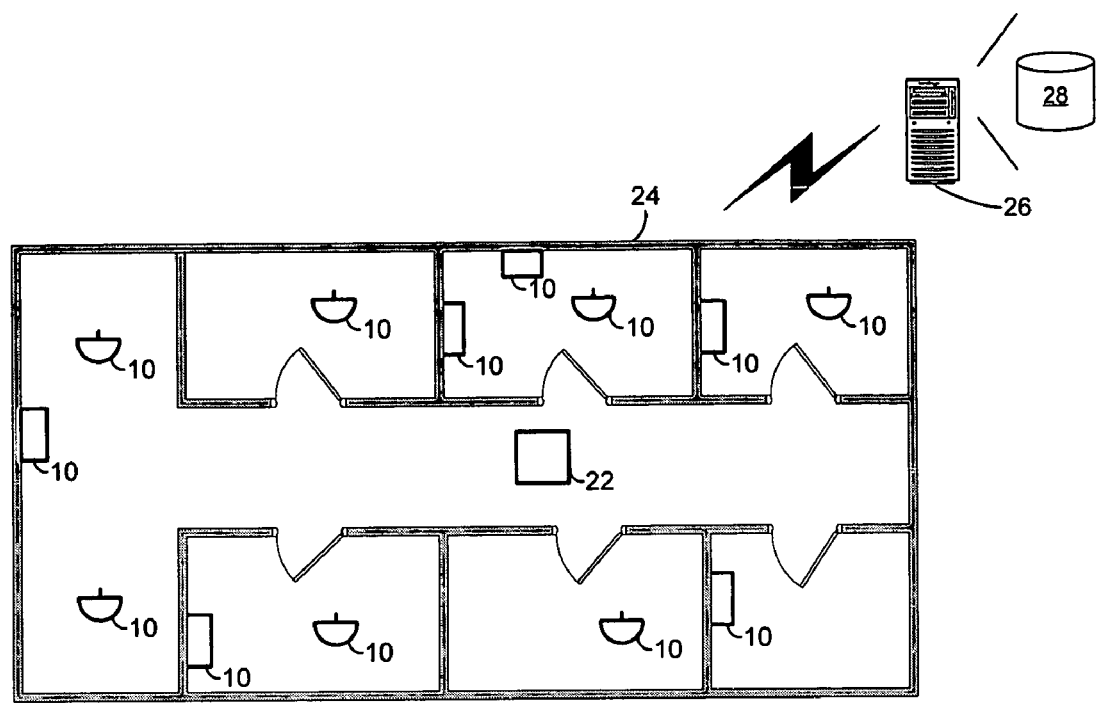
FIG. 2 is a top plan view of one embodiment of a network of building automation devices.

FIGS. 1 and 2 show a system for determining a distance for building automation components. FIG. 1 shows an exemplary building automation device 10 used within the system. The building automation device 10 includes a sensor or actuator 12, a processor 14, a wireless radio frequency transmitter or receiver 16, a speaker 18 and a microphone 20. Additional, different or fewer components may be provided. For example, the building automation device 10 is free of the speaker 18, the microphone 20, the speaker 18 and the microphone 20, the wireless transmitter or receiver 16, and/or the sensor or actuator 12.

The building automation device 10 is a controller, actuator, sensor or other device in a security, fire, environment control, HVAC, lighting, or other building automation system. The building automation device 10 may sense conditions within a building, report conditions within a building, and/or generate a signal representative of a building condition. The building automation device 10 also or alternatively may actuate building control components. As a controller, the building automation device 10 may be free of the sensor or actuator 12. In one embodiment, the building automation device 10 includes a wired connection to one or other devices 10 within the network and is either free of or also includes the wireless radio frequency transmitter or receiver 16. In yet another embodiment, the building automation device 10 is a wireless device free of communications or connections over wires to other remote devices. For example, the building automation device 10 is any one of the building control system devices, processors or controllers disclosed in U.S. patent application Ser. No. 10/951,034, the disclosure of which is incorporated herein by reference.

The sensor or actuator 12 is a single sensor, multiple sensors, single actuator, multiple actuators or combinations thereof. As a sensor, the sensor 12 is a temperature, pressure, humidity, fire, smoke, occupancy, air quality, flow, velocity, vibration, rotation, enthalpy, power, voltage, current, light, gas, $CO_2$, CO, combinations thereof or other now known or later developed sensors. The sensor also may be a limit or proximity switch. Micro-electromechanical or larger sensors may be provided for sensing any of various environmental or building conditions.

As an actuator, the actuator 12 is a valve, relay, solenoid, speaker, bell, switch, motor, motor starter, damper, pump, pneumatic device, combinations thereof or other now known or later developed actuating devices. For example, the actuator 12 is a valve for controlling flow of fluid or gas in a pipe, or a damper controlling air in a duct. As another example, the actuator 12 is a relay or other electrical control for opening and closing doors, releasing locks, actuating lights, or starting and stopping motors. As yet another example, the actuator 12 is a solenoid to open or close a damper, such as for altering airflow.

The device 10 may be a controller. The controller is positioned at a known or unknown location. As a controller, the building automation device 10 interacts with other building automation devices 10 for configuring, coordinating, influencing, controlling, or performing other control or reporting functions.

The processor 14 is a general processor, digital signal processor, application-specific integrated circuit (ASIC), fuel programmable gate array, analog circuit, digital circuit, network of processors, programmable logic controller, combinations thereof or other now known or later developed devices for processing data and/or controlling operation of the building automation device 10. The processor 14 has a processing power or capability and associated memory corresponding to the desired operation of the device 10 or a class of devices, such as an eight, sixteen, thirty-two, or sixty-four bit processor. By minimizing processor requirements and associated memory, the cost and power consumption of the device 10 may be reduced. Larger or smaller processors and associated memories may be used, such as a larger processor where the device 10 is operating as a controller.

The processor 14 is operable to cause transmission or reception actions by the wireless radio frequency transmitter or receiver 16, the speaker 18 or the microphone 20. For example, the processor 14 is operable to cause the acoustic speaker 18 to transmit an ultrasound signal. The processor 14 is also operable to cause the microphone 20 to receive an ultrasound signal and determine a distance from another device as a function of the received signal. Alternatively or additionally, the processor 14 is operable to cause the wireless radio frequency transmitter or receiver 16 to transmit data for determining the distance. Additionally or alternatively, the wireless radio frequency transmitter 16 transmits a determined distance or distances as well as data regarding the processes and operation of the sensor or actuator 12.

The wireless radio frequency transmitter and receiver 16 or the speaker 18 are alternate wireless transmitters operable to transmit a signal for distance determination. Similarly, the wireless radio frequency receiver 16 and microphone 20 are alternative wireless receivers operable to receive signals for distance determination.

The wireless radio frequency transmitter or receiver 16 is a transmitter, a receiver or a transceiver. The wireless radio frequency transceiver 16 operates pursuant to any of various now known or later developed communications protocols, such as IEEE 802 wireless communications protocols. The wireless radio frequency transceiver 16 is operable to transmit digital or analog information, such as a carrier wave modulated by digital signals. The wireless transceiver 16 transmits timing or other distance related information, such as a sinusoidal pulse. The wireless transceiver 16 is operable to receive timing or distance information, such as a transmitted pulse subjected to attenuation or other environmental alteration. Filters or other processes may be used to remove noise or other undesired information.

In an alternative or additional embodiment, the speaker 18 and microphone 20 are used for wirelessly transmitting and receiving information for determining a distance. The speaker 18 and microphone 20 are an acoustic transducer or transceiver. A piezoelectric ceramic or composite piezoelectric, a micro-electromechanical device, such as a flexible membrane or membranes, waveguide, or other now known or later developed speakers and microphones as separate devices or transceivers may be used. An array of acoustic transceivers is provided for directional processing, such as determining an angle for transmissions or receptions. An array may alternatively or additionally be used for generating a desired radiation pattern. Alternatively, a single acoustic transceiver is positioned on an outside of the device 10 to maximize the radiation pattern. The speaker 18 and microphone 20 are sized and shaped for operation at ultrasound frequencies, such as 20 kHz or higher. Frequencies in the megahertz range, such as 1 to 20 MHz, lower frequencies, or audible frequencies may be used.

The processor 14 is operable to control the acoustic transceiver for distance determination operation. For example, the processor 14 causes the acoustic transceiver 18, 20 to transmit an acoustic pulse, such as a sinusoidal, bipolar or unipolar pulse. Any of various pulse lengths may be used, such as single cycle or multiple cycle pulses. A desired transmit amplitude is provided, such as associated with transmitting the acoustic energy over a distance of 10-20 meters. The transmit amplitude may be adjustable. Depending on the building environment, such as an enclosed office building, the transmit amplitude may be set for reception by a likely plurality of other devices within a restricted space. The processor 14 is also operable to process received information, such as identifying a zero crossing, amplitude or other characteristic of received acoustic energy.

Where a wireless radio frequency transceiver 16 is provided with the speaker 18 and microphone 20, the wireless radio frequency transceiver 16 is used to control operation of the processor 14 and distance measurements using the acoustic transceiver 18, 20. Control signals are received wirelessly using the wireless radio frequency transceiver 16. The control signals coordinate distance determination among various devices or for a specific device. For example, the control signals indicate when and what type of a test signal or actual measurement signal is transmitted for distance determination. As another example, control signals from the wireless transceiver 16 instruct the processor 18 to act to receive or not act to receive acoustic transmission from one or other different devices. Control signals may be used to alter or insert a time delay, set signal strength, select signal processing, establish communications protocol, provide the delay information, provide time-of-flight information or control another process.

The processor 14 also may be operable to perform distance determination functions. In an embodiment, the processor 14 determines a distance between building automation devices 10, a building automation device 10 and another device, or the building automation device 10 and a reference point, such as an origin of a coordinate system or a building reference. The distance is determined by the same processor used for initiating the transmission of a signal, the processor that receives a first transmitted signal, or a processor remote from either of the devices that transmitted the distance signal or received the distance signal for determining time-of-flight.

In one embodiment, the processor 14 uses time-of-flight information to determine distance. A one-way time-of-flight associated with transmitting from one component and reception at another component may be used. Alternatively or additionally, a two-way time-of-flight is used where one component transmits a signal, another device receives the signal and responsively transmits another signal and the originating device receives the responsively transmitted signal. The processor 14 may be configured to identify the first to arrive signals, to distinguish between echoes of radio frequency or acoustic signals. A first signal having sufficient signal strength is selected as the signal of interest. Echoes have a longer distance to travel, so are later arriving. Coding or other techniques may be used to indicate a signal of interest as compared to noise or other signals. Alternatively, an amplitude threshold is used to indicate a signal of interest as compared to noise. For more accurate time-of-flight determination, a characteristic of the received signal is analyzed to identify a time at which a portion of the signal was received. A first, second or other zero crossing is identified in one embodiment for higher resolution timing. Zero crossing information may be interpolated from samples associated with a zero crossing. Each received signal in a two-way response system is identified using a same portion or different portions of the signal, such as a same zero crossing.

The signal is sampled to identify information to the desired accuracy. A 12 GHz sampling may resolve radio frequency information to an inch, a 6 GHz sampling frequency may resolve information to two inches, a 1 GHz sampling frequency may resolve information to one foot, and a 500 MHz sampling frequency may resolve information to two feet. Other relative frequencies and associated resolutions may be provided. Sound travels at approximately 1.1 feet per millisecond, so may be sampled at a lesser frequency while still providing high accuracy at an inch, foot or yard level.

For two-way response, the processor 14 is operable to insert a time delay. For example, the processor 14 is part of a device 10 that responds to a transmitted signal with an additional transmitted signal. The processor 14 identifies a particular portion of the signal or a general time when the signal is received. The processor 14 then delays a set time period, such as a time period associated with providing a sufficient time for the processor 14 and the device 10 to react, before generating a transmit signal in response. The set time delay may be preprogrammed, such as during manufacturing of the device, programmed after installation through wireless radio frequency control signals or manually configured. The processor 14 associated with determining the distance determines the distance as a function of the time-of-flight and the set time delay. The set time delay is communicated or previously programmed into the processor 14. The set time delay is subtracted from the roundtrip time calculated by the processor 14. The roundtrip time is then divided by two and multiplied by the speed of sound and/or light depending on the type of signal. The result provides a distance.

The transmitted signal may include coding information indicating a time of transmission. The received signal may then be used to determine time-of-flight. Where synchronization between devices is unavailable, a two-way distance determination may avoid inaccuracies due to unsynchronized clocks. Alternatively, synchronization is provided allowing one-way or two-way determination of distance. The synchronization is provided over a common clock or heartbeat signal provided wirelessly or through a wired connection to the device 10. Alternatively, the distance is input by a user or measured manually.

To minimize the effects of interference, both acoustic and radio frequency distance determinations may be performed at same or different times. Other mechanisms to minimize the effects of noise may be provided, such as only accepting distances less than a certain value, such as 10 meters or other value associated with a likely relationship between two devices 10. The threshold may vary as a function of the type of device 10.

FIG. 2 shows a floor layout for a network of devices 10 operating with one or more controllers 22 within a building 24. The devices 10 are located throughout the building at spaced apart or distally located positions. One or more devices 10 may be located in each of or a number of rooms within the building 24. Different spacings may be provided. While one controller 22 is shown, a plurality of controllers 22 may be provided in other embodiments. Additional, different or fewer devices 10 and controllers 22 may be provided. Different distributions of the devices 10 may be provided. While shown as a single floor of a building 24, the network of devices 10 and controllers 22 may be distributed over multiple floors, a portion of the floor, a single room, a house or any other building 24 or portion thereof. In one embodiment, the network of devices 10 and controllers 22 is a network for wireless building automation or control, such as disclosed in U.S. patent application Ser. No. 10/951,034, which is incorporated herein in its entirety. Other wireless or wired networks may be provided in alternative embodiments.

The various devices 10 are of a same configuration or different configuration than each other. For example, some of the devices 10 correspond to sensor arrangements while other devices 10 correspond to actuator arrangements. The same or different communications devices, such as the transceiver 16 or the acoustic transceiver 18, 20, are provided for each of the devices 10. Alternatively, different communications mechanisms and/or protocols are provided for different groups of the devices 10. The devices 10 may operate in an integrated manner for implementing one or multiple types of building automation control. Alternatively, different networks are provided for different types of building automation, such as security, HVAC and fire systems.

The controller 22 is a device 10 without a sensor or actuator 12. Alternatively or in addition, the controller 22 includes a sensor or actuator 12, and is operable to provide control services for other devices 10. The controller 22 wirelessly communicates with one or more spaced apart building automation devices 10. For example, acoustic or radio frequency communications are provided.

A distance determination is made between a controller 22 and one or more devices 10, between devices 10, between one or more devices device 10 and a reference point, between one or more controllers 22 and a reference point, or any combination thereof. The reference point may be any point or position having a known or predetermined location or coordinate identification within a reference system. The reference point may be the known or predetermined location within a building structure for a controller 22, a device 10 or any other known area from which distances may be determined. The distances may be determined without information or control from the controller 22. Alternatively, the controller 22 triggers, controls or alters the distance determination between two given devices 10. In other embodiments, the distance associated with the device 10 is performed relative to the controller 22, such as where the position of the controller 22 is known.

The distance determination may be performed using wired or wireless transmissions. Wireless radio frequency transmissions and receptions between building automation components within a network, between a component and a reference point, or between similar components for determining a distance may be performed. Spread spectrum or code phasing may be used for distance determinations. The distance may be determined as the result of one or more radio-frequency communications of a test signal, may be based on transmission and reception of acoustic signals, such as an ultrasound signal, or combinations thereof. The distance determination may be a one-way distance determination based on the time-of-flight from the transmission of the signal to the reception of the signal. Clocks or time stamps may be provided provide accurate relative timing. The distance determination may be made based on two-way communications using a predetermined time-delay. Other control schemes or mechanisms may also be provided. Examples of schemes, techniques, methods, processes and apparatuses for wirelessly determining distances in automated building control are described in co-pending patent applications, U.S. patent application Ser. No. 10/937,078, filed on Sep. 9, 2004 and entitled Distance Measurement for Wireless Building Automation Devices, and US. patent application Ser. No. 10/937,078, filed on Sep. 9, 2004 and entitled Triangulation of Position for Components of Automated Building Control System, both of which are incorporated herein in their entirety.

In one embodiment, the controller 22 provides a reference point and has a known coordinate location (X, Y, Z) within a building structure. The coordinate system identifying the known location (X, Y, Z) of the controller 22 may be any system for identifying the location of controller 22. The coordinate system may be a two-dimensional or three-dimensional reference system. The coordinate system may be associated with the structure of the building 24, equipment within the building 24, a blueprint for the building, relative to the earth, any combination thereof, or any other reference chart. The controller 22 coordinates a distance determination of other devices 10 and/or controllers 22. The controller 22 causes one of the devices to transmit distance information, or a beacon. Information is received from other adjacent devices indicating reception or lack of reception of sufficient signal strength. The power of subsequent ranging signals from a given device 10 may be increased and/or devices operable to receive the test ranging signal of sufficient strength are assigned to interact with the device 10 for determining the distance from various locations. The distances from the device 10 acting as a source of the test signal to each of the assigned devices 10 is then determined.

The distances between devices 10, between a device 10 and a controller 22, between devices 10 and a reference point, and/or between a controller 22 and a reference point are identified and stored as distance information in a storage device. The storage device may be a memory of the controller 22, the device 10, or a combination of the controller 22 and devices 10. Alternatively or additionally, the distance may be stored in a memory of central processor 26. The central processor 26 may be in communication with the controller 22. The central processor 26 may be coupled with the controller 22 through a wired or wireless communication. The central processor 26 also may be in communication with devices 10 through a wired or wireless communication.

The central processor 26 may also provide a reference point on which distance determinations are based.

Based on the distance information, local position or coordinate location for the devices 10 and controllers 22 are determined. The local position and/or coordinate location may be determined by the central processor 26, a controller or other devices configured to determine local position and/or coordinate locations. The locations of the devices 10 may be determined or triangulated based on a known location, such as the known location of a controller 22 and/or the central processor 26. The locations of the devices 10 and the controller 22 also may be determined or triangulated based on the distances between the devices 10. The location and position information may be stored in the database 28. The database 28 may cross-reference identification information for devices 10 and controllers 22, such as address and type information, with corresponding distance, position and/or location information. Alternatively or additionally, the distance, location and/or position information may be stored in the memory storage of the devices 10, the controllers 22 or distributed among the devices 10 and the controllers 22.

From the distance, position and/or location information, relationships among devices 10 and controllers 22 may be established. Applications, associations, and utilizations for the devices 10 and the controllers 22 are developed according to the relative location and/or positions of the devices. The applications, associations, and utilizations for the devices 10 and the controllers 22 may be developed or determined by the central processor 26, a controller or other devices configured to determine local position and/or coordinate locations. The applications, associations, and utilizations for the devices 10 and the controllers 22 may also or alternatively be developed or determined by the devices 10 and/or controllers 22. The database may sort or group the devices 10 and controller 22 according to proximity of devices.

Figure 3:
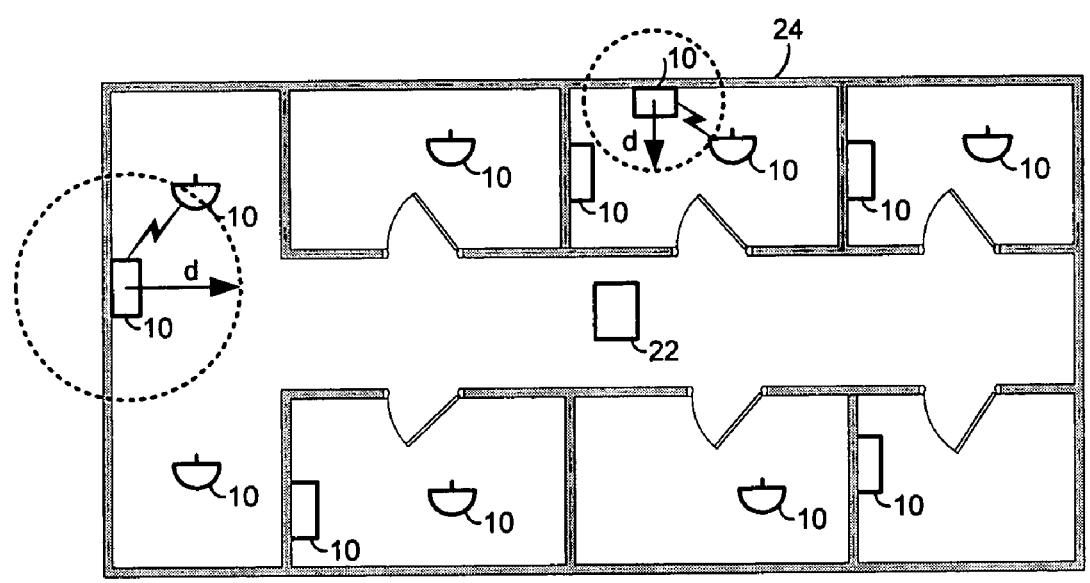
FIG. 3 is a top plan view of one embodiment of a network of building automation devices.

FIG. 3 illustrates the floor layout for the network of devices 10 of FIG. 2. The distance, position and/or location information may be used to assign a control application to a controller 22 for controlling known proximate devices 10. Once the location or position of a device is known, a process appropriate for the location may be selected. For example, the distance, position and/or location information may be used to determine what temperature range to maintain in a particular space, and how to control the temperature within the space. The space may be the building 24 or a portion of the building 24, such as a room. The application may be assigned based on the location of the device 10 and/or controller 22, substantially independent of a cross-reference to a manually assigned address for a location.

Based on the distance, position and/or location information, devices 10 most proximate to a controller 22 may be identified. Devices 10 and/or controllers 22 may be associated with a network or system over which communication among devices 10 and or controllers 22 may communicate. Binding associations between the controllers 22 and respective devices 10 may also or alternatively be established. The binding association between devices 10 and/or controllers 22 established a communication assignment between the devices 10 and/or controllers 22. For example, devices that share a binding association may have a common application for controlling environmental conditions.

For each device 10, a most proximate device 10 and/or controller 22, or order of most proximate devices 10 and/or controllers 22 may be identified. As shown in FIG. 3, binding associations may be assigned between devices 10, between devices and controllers 22, and between controllers 22. The binding association may be determined according to proximity of the devices and/or controllers 22. Devices 10 proximate to each other may be assigned to communicate with each other. Devices 10 additionally or alternatively may be assigned to communicate with a respective most proximate controller 22. Similarly, the controller 22 may be assigned to provide control services to the devices 10 that are determined to be most proximate to the controller 22. Addresses for the devices 10 and controllers 22 may be automatically assigned and propagated to the corresponding controller 22 for communication with the device 10. The binding associations may be stored in the database 28 and an association table generated. The binding associations may be updated with changes to the network or system. For example, a binding association between a device 10 and a controller 22 may be updated with changes in locations for devices 10 and controllers 22, in loads, with communications, or if a device 10 and/or controller 22 fails or is relocated.

The distance, position and/or location information may also be used to control communications among devices 10 and controllers 22. Based on the known distance d to a proximate device 10 or controller 22, the strength of a broadcast signal may be adjusted to the known distance d to an associated device 10 or controller 22. The strength of a broadcast signal may be decreased to have only substantially sufficient power to travel the known distance d. Energy consumption may be optimized by adjusting broadcast strength to appropriate levels. If a communication fails, the strength of the broadcast signal may be increased to a strength that is sufficient for the broadcast signal to travel the known distance to the next most proximate device 10 and/or controller 22.

The distance, position and/or location information may also be used to map or plot the location and/or position of the devices 10 and controller 22. The distance, position and/or location information may be used to populate a map, chart, plot, blueprint, architectural drawing, schematic drawing, computer-assisted design drawing, or other building designs, such as the map illustrated in FIGS. 2 and 3. The map illustrates the location and/or position for each device 10 and/or controller 22 with respect to the building structure. The map may be an electronic two-dimensional illustration of the structure of the building 24, such as a floor layout, or may be a three-dimensional map illustrating a three-dimensional space of the structure of the building 24. A scanned or computer assisted design map is referenced and scaled to the coordinate system of the devices 10 and/or controllers 22. The map may be derived from coordinate information associated with the building structure and the equipment therein.

The location and position information from the devices 10 and the controllers 22 may be integrated with or compiled with the coordinate information of the map to provide an accurate chart for the devices 10 and controllers 22. If a device 10 or controller is moved, a new location and/or position may be determined and the map information updated. The integration or update is performed automatically with a processor.

The map may be displayed on any monitor or electronic display device. A location of interest may be highlighted, such as flashing information at a location of interest. The map also may be generated on a tangible medium or printed form. The map may be stored and regularly or periodically updated. The map may integrate all or other building automation systems. Reporting of a failed device may be cross-referenced across systems. For example, the location of a temperature sensor that senses a rapid increase in room temperature may be communicated to a fire-detection or protection system. The fire system examines whether there may be a fire hazard at the location or an alarm may be triggered to dispatch an individual to investigate. The investigation is assisted by the precise position information. Similarly, devices 10 may be controlled based on information received from other systems. For example, an actuator 10 may be controlled to close ventilation ducts and close a proximate door when a fire is detected at a specific location of those actuators 10.

Figure 4:
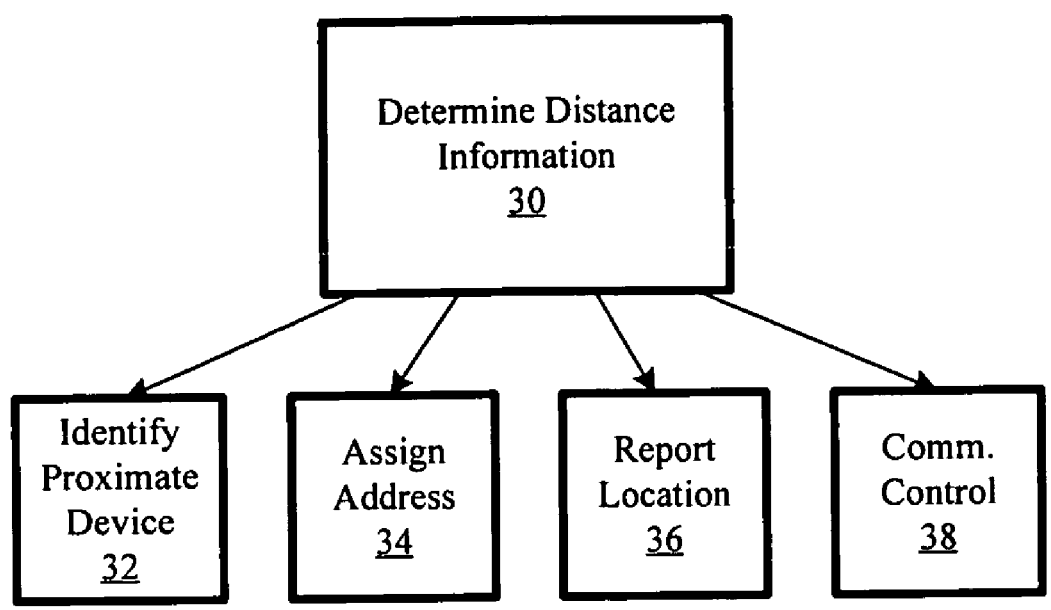
FIG. 4 is a flow chart diagram of one embodiment of a method for determining a distance for building automation components.

FIG. 4 shows an exemplary flowchart for a method for locating building automation devices. The method is implemented using the devices 10 shown in FIG. 1, the network of devices 10 and controllers 22 shown in FIG. 2 or different devices or networks. Different, additional or fewer acts may be provided than shown in FIG. 4. For example, act 30 is performed without previous acts. As another example, acts 32 through 38 are performed independently. As another example, acts 34 through 38 are performed without act 32. As another example, acts 34 through 38 are performed subsequent to act 32 and based on information determined in act 32.

As represented in act 30, the distance determination for a network of devices, including a building automation device within a building, is performed. The distance determination may include determining the distance of one or more devices in the network. The distance information may include distances between a plurality of building automation devices based on wireless communication of distance information between building automation devices. The distance determination also may include one or more distance determinations to a reference point. From the distance information, local positions or coordinate locations of devices 10 and/or controllers may be determined.

Act 32 is performed to identify proximate devices 10 and/or controllers 22. Proximate devices 10 and/or controllers 22 may be identified according to the determined distances between the building automation devices. Additionally or alternatively, proximate devices 10 and/or controllers 22 may be identified based on the determined relative local positions and/or coordinate locations for the devices 10 and/or controllers 22. Associations between and among devices 10 and/or controllers 22 may be assigned. For example, devices 10 and/or controllers 22 may be associated with a communication network over which the devices 10 and/or controllers 22 communicate using a wireless communication protocol. The devices 10 and/or controllers 22 may be grouped or assigned binding associations with other devices 10 and/or controllers 22 according to the determined distances between the building automation devices. Additionally or alternatively, groups or binding associations may be assigned according to the local positions and/or coordinate locations of the devices 10 and/or controllers 22, and/or proximity to other devices 10 and/or controllers. For example, the determined locations may be used to confirm that devices 10 and controllers 22 are in the same room or portion of a building. The devices 10 that are determined to be in the same room may have a binding association with each other to provide environmental control for that room. A local controller 22 also may be identified and a binding association assigned for the devices 10 in the room. Similarly, a device 10 may be determined to be most proximate to a device 10 that is identified as located in a separate room. Because the devices are in separate rooms, separate binding associations between the devices may be developed.

Act 34 is performed to assign address information to devices 10 and/or controllers 22. The address information may be a network address, a MAC address or other information identifying a device 10 and/or controller 22. The address for devices 10 and/or controllers 22 may be assigned according to a local position or coordinate location. Similarly, the devices 10 and/or controllers may have a unique identification number or serial number, such as an identification number stored in a memory for the device 10 and/or controller 22. The address information and/or unique identification number for the devices 10 and/or controllers 22 may be cross-referenced to the local position and/or coordinate location in a searchable database. The address or unique identification number of a device 10 and/or controller 22 may be searched to identify the corresponding position or location of the device 10 and/or controller 22. Likewise, the position or location of a device may be searched to identify an address or unique identification number of the corresponding device 10 and/or controller 22.

Act 36 is performed to report the locations of devices and/or controllers 22. The report may include a visual map, drawing, chart or plot of the positions and/or locations of the devices 10 and or controllers 22. The map may illustrate the positions with respect a local environment, such as the building structure. The report also or alternatively may include an alert for a failing device 10 and/or controller 22 or an alarm condition indicated by a device 10 and/or controller 22. For example, an electronic map may be provided with a flashing indicator identifying the location of a failed device 10 or device indicating an alarm condition. The report also or alternatively may include communication of information regarding a sensed condition. For example, the location of a device 10 that has sensed rapid change in temperature or air flow may be displayed on a remote video monitor. The location may also be communicated with other building automation systems, such as fire detection and protection systems. Additionally or alternatively, the report may be a listing, such as a textual report including description of the location and/or position of devices 10 and/or controllers 22. The listing also may include other associated information such as room location, related associations for the devices 10 and or controllers 22, address information, and unique identification information.

Act 38 is performed to assign a process application for the devices 10 and/or controllers 22. The devices 10 and/or controllers 22 may be assigned one or more process applications according to the determined distances between the building automation devices. Additionally or alternatively, process applications may be assigned according to the local positions and/or coordinate locations of the devices 10 and/or controllers 22, and/or proximity to other devices 10 and/or controllers 22. For example, a device 10 configured to monitor temperature may be identified in a room where no air flow actuators are located. Based on the identified location and a determination that there are no actuators located within the room, the device 10 may be assigned a process application to configure the device as a fire sensor. In another example, an actuator 10 configured to control airflow, air conditioning and/or heating in a room having a window with a southern exposure may be configured to run a different a process application than an actuator 10 in a room with no windows. As another example, a device 10 may be configured as an actuator in a room having more than one device 10 configured as a temperature sensor. The actuator 10 may be assigned a process application appropriate for receiving information from more than one temperature sensors.

Act 40 may be performed to control communication with and among devices 10 and/or controllers 22 according to distance determinations. For example, a broadcast signal for a device 10 to an associated controller 22 may be controlled according to the determined distance between the device 10 and controller 22. The strength of a broadcast signal between the device 10 and controller may be adjusted to the determined distance between the device 10 and controller 22. Devices 10 and/or controllers 22 may be configured to relay control information from a processor. For example, controller information may be relayed from a processor to a destination controller 22. The relay path among the controllers 22 may be determined according to the locations for the controllers 22 between the processor and the destination controller 22.

In one embodiment, devices may be readily located using mapped locations of building automation devices. The device may be a malfunctioning device, or a device indicating an alarm condition. The map may be generated in real-time as locations for devices are identified, or may have been stored in a memory device. A listing, map, chart or blueprint including the determined locations may be generated and displayed on a video monitor. The video monitor may be a fixed monitor such as a computer monitor, or may be portable such as a handheld display. The map also may be a real-time map that may be updated to display a current position or location as a user moves about a mapped environment. For example, the position of the display is wirelessly determined periodically or in real-time. The malfunctioning device may be displayed on the chart with respect to the building structure and/or momentary position of a mobile user. The device also may emanate a chirp to allow the user to find a malfunctioning device within hearing range of the chirp.

As another example, mobile devices may be tracked within a monitored environment. Sensors may be positioned on mobile devices or transportable devices such as an identification tag, a computer, a personal digital assistant, a chair, table, desk or the like. As the device with the sensor moves within the monitored environment, the device may communicate distance information with another device to determine an instantaneous or momentary position of the device. Based on the position, control applications may be assigned or modified according to the position of the device. For example, a temperature or lighting application is altered. When the device leaves an area, applications and associations may return to previous states.

As another embodiment, assets may be tracked within a building structure to provide asset management by wireless location tracking of the assets. A tag wirelessly communicates with the building devices and/or controllers. A wireless building control system communicates the position of the tag, providing the position of a tagged asset. The tagged asset may be a lap top computer, lab equipment, furniture, or personnel.

While the invention has been described above by reference to various embodiments, it should be understood that many changes and modifications can be made without departing from the scope of the invention. The description and illustrations are by way of example only. Many more embodiments and implementations are possible within the scope of this invention and will be apparent to those of ordinary skill in the art. The various embodiments are not limited to the described environments, and have a wide variety of applications including integrated building control systems, environmental control, security detection, communications, industrial control, power distribution, and hazard reporting.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

I claim:

1. A method for locating building automation devices, the method comprising:
   determining locations of a plurality of building automation devices, the locations being determined using distance information acquired from wireless communication between the plurality of building automation devices;
   using the distance information acquired from wireless communication between the plurality of building automation devices to create an electronic map illustrating the locations of the plurality of building automation devices with respect to a building structure;
   displaying the electronic map; and
   assigning a process application to at least one of the plurality of building automation devices based upon a corresponding location of the at least one of the plurality of building automation devices calculated as a function of wireless communication between the plurality of building automation devices.

2. The method of claim 1 where the locations are determined according to a distance to a reference point for at least one of the plurality of building automation devices.

3. The method of claim 1 further comprising identifying a proximate building automation device of at least one building automation device.

4. The method of claim 3 further comprising assigning a binding association between the at least one building automation device and the proximate building automation device based upon distance data acquired via wireless communication or position information derived therefrom.

5. The method of claim 4 further comprising controlling wireless communication between the at least one building automation device and the proximate building automation device based on determined locations of the at least one building automation device and the proximate building automation device calculated from data acquired via wireless communication.

6. The method of claim 5 further comprising assigning a network address to each of the plurality of building automation devices according to the locations of the plurality of building automation devices determined using data acquired from wireless communication between the plurality of building automation devices.

7. The method of claim 1 further comprising assigning a network address to a building automation device according to the locations for the plurality of building automation devices determined using data acquired from wireless communication between the plurality of building automation devices.

8. The method of claim 1 where the distances are determined automatically by a processor performing a triangulation technique.

9. The method of claim 1 where the electronic map includes a location of interest associated with at least one of the plurality of building automation devices.

10. A method for controlling building automation, the method comprising:
- determining a local position for at least one building automation device, the local position being determined with respect to a reference point using data acquired via wireless communication with the building automation device;
- assigning an application process to the at least one building automation device according to the local position for the at least one building automation device determined with respect to a reference point using data acquired via wireless communication; and
- assigning a binding association between the at least one building automation device and a controller according to a proximity between the at least one building automation device and the controller determined as a function of wireless communication between two or more building automation nodes.

11. The method of claim 10 further comprising using distance information acquired via wireless communication to map the local position for the at least one building automation device to a system plan.

12. The method of claim 10 further comprising assigning an address to the at least one building automation device according to the local position for the at least one building automation device.

13. The method of claim 10 further comprising controlling communication with the at least one building automation device according to the local position for the at least one building automation device determined using data acquired via wireless communication with the at least one building automation device.

14. The method of claim 10 further comprising:
- determining local positions for a plurality of building automation devices, the local position being determined using wireless communications; and
- automatically populating a system plan with the local position for the plurality of building automation devices.

15. The method of claim 14 further comprising assigning an address to the plurality of building automation devices according to the local positions for the plurality of building automation devices determined using data acquired via wireless communication.

16. The method of claim 14 further comprising controlling communication among the plurality of building automation devices according to the local positions for the plurality of building automation devices determined using data acquired via wireless communication.

17. The method of claim 14 further comprising assigning an association between at least two of the plurality of building automation devices according to the local positions for the plurality of building automation devices determined using data acquired via wireless communication.

18. The method of claim 14 where the local positions for the plurality of building automation devices are determined according to the local position for the at least one building automation device.

19. The method of claim 14 where the local positions for the plurality of building automation devices are determined according to a building reference, the system plan associating the plurality of devices with respect to the building reference.

20. The method of claim 14 where the local position is determined using a triangulation technique.

21. The method of claim 20 where the local position is further determined as a function of a set time delay and time of transmission of radio communication signals.

22. A building automation system comprising:
- at least one building automation device; and
- a processor configured to determine a local position for at least one building automation device, the local position being determined using distance information acquired via wireless communication with the at least one building automation device and to assign (1) an application process to the at least one building automation device and (2) a binding association to the at least one building automation device, the binding association being between the at least one building automation and another building automation device, according to the distance information acquired via wireless communication or the local position determined using the distance information acquired via wireless communication.

23. The system of claim 22 where the at least one building automation device is assigned an address according to the local position for the at least one building automation device determined using distance information acquired via wireless communication with the at least one building automation device.

24. The system of claim 22 where communication with the at least one building automation device is controlled according to the local position for the at least one building automation device determined using distance information acquired via wireless communication.

25. The system of claim 22 further comprising a processor configured to determine a local position for a plurality of building automation devices using wireless communications and to populate a system plan according to the local position for the plurality of building automation devices determined via wireless communications.

26. The system of claim 25 where addresses are assigned to the plurality of building automation devices according to the local positions for the plurality of building automation devices determined using data acquired via wireless communication.

27. The system of claim 25 where communication among the plurality of building automation devices is controlled according to the local positions for the plurality of building automation devices determined using data acquired via wireless communication.

28. The system of claim 25 where the local positions for the plurality of building automation devices are determined according to the local position for the at least one building automation device.

29. The system of claim 25 where the local positions for the plurality of building automation devices are determined according to the building reference.

30. The system of claim 25 where the local position is determined using a triangulation technique.

31. The system of claim 22 where the local position is determined as a function of a set time delay and time from transmission of radio communication signals.

32. A building automation system, comprising:
- at least one wireless building sensor configured to communicate over a wireless network using a wireless network communication protocol; and
- at least one building actuator in communication with the at least one wireless building sensor over the wireless network, the building sensor having (1) a process application and (2) a binding association with the building actuator determined as a function of a wireless communication distance determination, the process application being assigned to the building sensor via wireless communication, wherein the process application and binding association are associated with controlling a building environmental condition.

33. The system of claim 32 where a communication signal between the building sensor and the building actuator is controlled according to a wireless communication distance determination.

34. The system of claim 32 where the distance determination includes a radio communication distance measurement between the building sensor and the building actuator.

35. The system of claim 32 where the distance determination includes a radio communication distance measurement between the building sensor and a building reference.

36. The system of claim 32 where the at least one building sensor and the at least one building actuator are assigned network addresses according to a wireless communication distance determination.

37. The system of claim 32 where the distance determination includes a radio communication distance measurement between the building actuator and a building reference.

38. The system of claim 32, comprising:
a plurality of wireless building sensors configured to communicate over the wireless network using a wireless network communication protocol; and
a plurality of building actuators configured to communicate over the wireless network using wireless network communication protocol, each of the plurality of building actuators in communication with at least one corresponding building sensor over the wireless network, the plurality of building sensors being assigned to the at least one corresponding building actuator according to a wireless communication distance determination.

39. The system of claim 38 where a communication signal between a building sensor and corresponding building actuator is controlled according to a wireless communication distance determination.

40. The system of claim 38 further comprising a display configured to illustrate a plot of the plurality of wireless building sensors with reference to building structure.

41. The system of claim 40 where the display is configured to illustrate a location of interest for at least one of the sensors.

42. The system of claim 38 further comprising a display configured to illustrate a plot of the plurality of wireless building actuators with reference to building structure.

43. The system of claim 42 where the display is configured to illustrate a location of interest for at least one of the actuators.

44. A building control network, the system comprising:
a plurality of distally located building automation devices within a building; and
a controller operable to wirelessly communicate with the plurality of distally located building automation devices, the controller (1) determining a coordinate location for at least one of the distally located building automation devices using time-of-flight information associated with wireless communication with the at least one of the distally located building automation devices, and (2) automatically mapping the coordinate location determined via wireless communication to a system plan for the building, (3) assigning an address to at least one of the distally located building automation devices according to the coordinate location determined via wireless communication of the at least one distally located building automation devices, and (4) assigning a binding association between the at least one of the distally located building automation devices and the controller according to the coordinate location determined via wireless communication of the at least one distally located building automation devices.

45. A method for controlling building automation, the method comprising:
determining a local position for at least one building automation device, the local position being determined with respect to a reference point using information acquired via wireless communication with the at least one building automation device;
assigning an address to the at least one building automation device according to the local position for the at least one building automation device determined using the information acquired via wireless communication with the at least one building automation device;
controlling wireless communication with the at least one building automation device according to the address for the at least one building automation device determined as a function of wireless communication with the at least one building automation device; and
subsequently using the assigned address to determine the local position for the at least one building automation device.

46. The method of claim 45 further comprising using data obtained from wireless communication with the at least one building automation device to automatically map the local position for the at least one building automation device to a system plan.

47. The method of claim 45 further comprising:
determining local positions for a plurality of building automation devices, the local position being determined using time-of-flight data acquired from wireless communications; and
assigning addresses to the plurality of building automation devices according to the determined local positions for the building automation devices.

48. The method of claim 47 further comprising controlling communication among the plurality of building automation devices according to the addresses for the plurality of building automation devices.

* * * * *